United States Patent [19]

Ray

[11] Patent Number: 4,850,605
[45] Date of Patent: Jul. 25, 1989

[54] BOAT DOLLY

[76] Inventor: Joe R. Ray, 746 Millstream Dr., San Jose, Calif. 95125

[21] Appl. No.: 258,808

[22] Filed: Oct. 17, 1988

[51] Int. Cl.$^4$ ................................................ B62B 1/28
[52] U.S. Cl. ................................ 280/47.331; 114/344
[58] Field of Search ........... 280/414.1, 414.2, 47.13 B, 280/63, 79.1 A, 47.331; 114/344

[56] References Cited

U.S. PATENT DOCUMENTS

| | | | |
|---|---|---|---|
| 2,534,367 | 12/1950 | Perrotta et al. | 280/79.1 A |
| 2,978,257 | 4/1961 | Barker | 280/179 |
| 2,997,292 | 8/1961 | Lucker et al. | 269/112 |
| 3,101,203 | 8/1963 | Raymond | 280/47.13 B |
| 3,159,410 | 12/1964 | Raymond | 280/414.2 X |
| 3,687,476 | 8/1972 | Abbott | 280/47.32 |
| 3,717,357 | 2/1973 | Schaefer | 280/79.1 A X |
| 4,327,933 | 5/1982 | Tuggle | 280/414.2 |
| 4,429,893 | 2/1984 | Palamara | 280/414.1 |
| 4,465,291 | 8/1984 | Wylie et al. | 280/47.13 B |
| 4,561,667 | 12/1985 | Allia | 280/47.13 B |
| 4,601,481 | 7/1986 | Maurice | 280/47.13 B |

*Primary Examiner*—Charles A. Marmor
*Assistant Examiner*—Michael Mar
*Attorney, Agent, or Firm*—Jack M. Wiseman

[57] ABSTRACT

A boat dolly has a wheel supported carrier. The carrier has spaced abutment plates, which support a boat tipped on its side. One of the abutment plates engages the bottom of the boat. The other abutment plate engages the lower side gunwale of the boat. The abutment plate that engages the bottom of the boat is adjustably secured to the carrier or regulating the distance between the abutment plates.

17 Claims, 2 Drawing Sheets

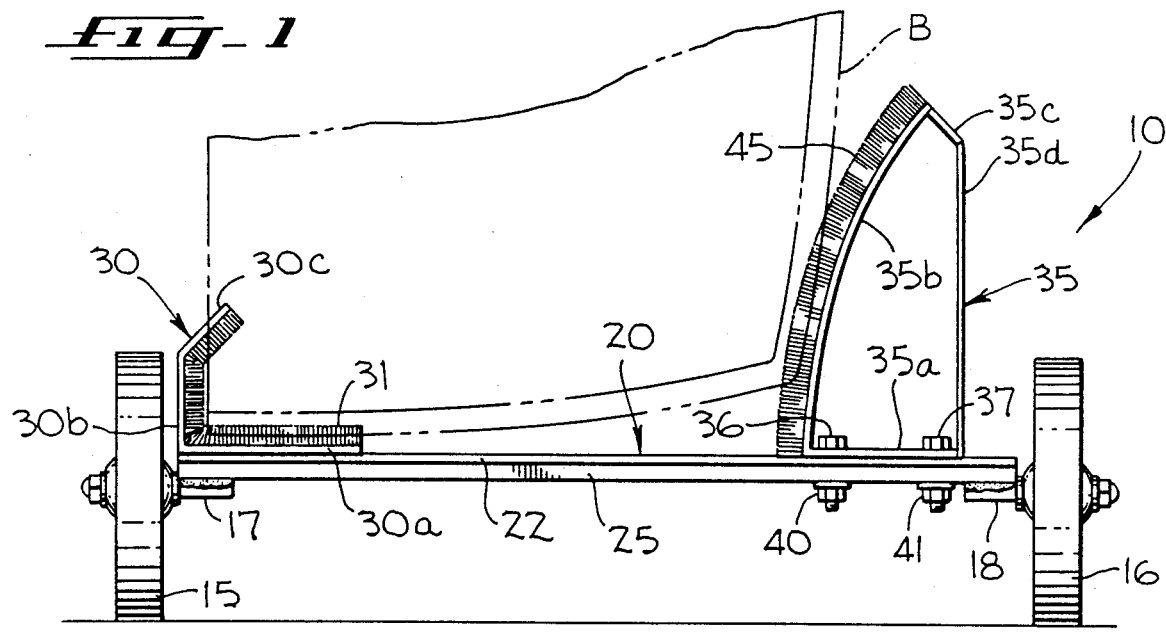
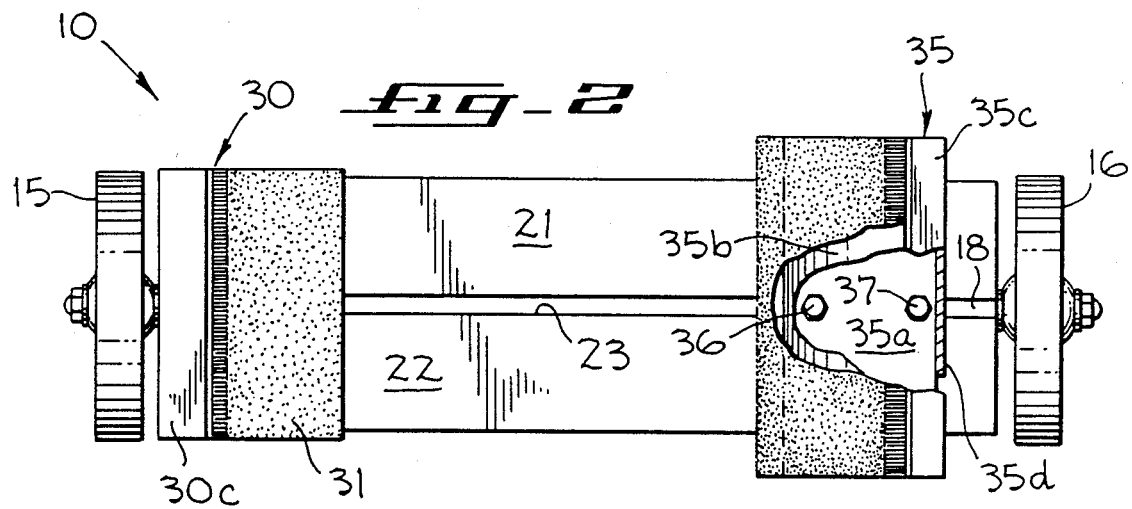
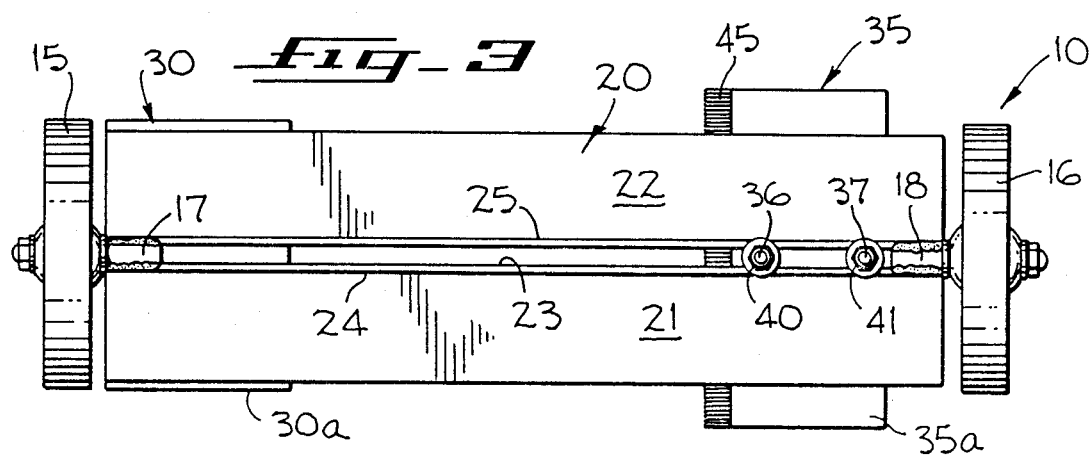

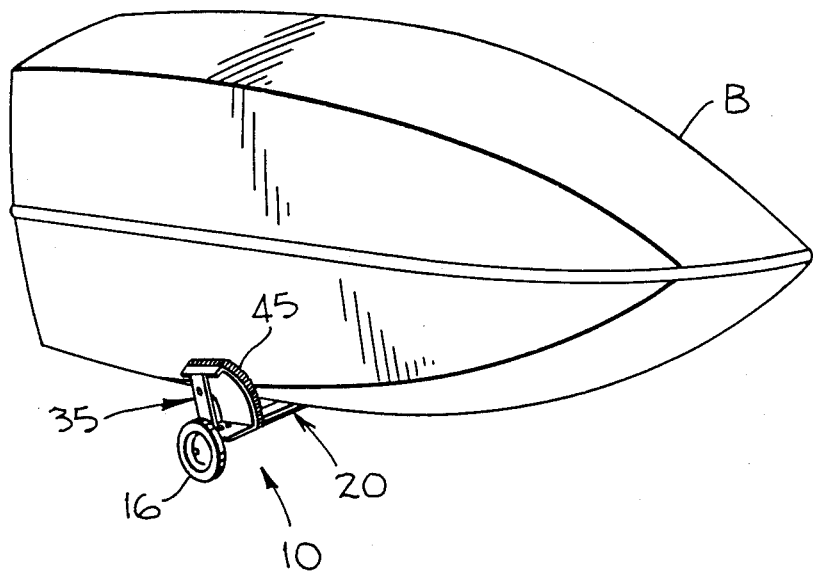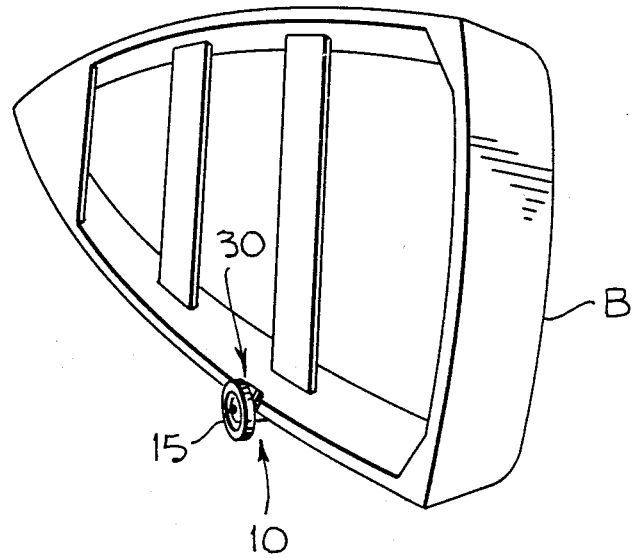

BOAT DOLLY

BACKGROUND OF THE INVENTION

The present invention relates in general to a boat dolly, and more particularly to a boat dolly for a small craft.

The Barker, U.S. Pat. No. 2,978,257, issued on Apr. 4, 1961, for Boat Carrier, discloses a boat carrier in which a wheel carrier supports the keel of a boat and in which adjustable cable members through hooks engage the opposite side member of the boat.

In the Maurice, U.S. Pat. No. 4,601,481, granted on July 22, 1986, for Portable Boat Dolly, there is disclosed a pair of transversely spaced wheel carriers which support the bottom wall of a boat. Cables with hooks extend from the wheel carriers, respectively, and engage the respective gunwales of the boat.

In the Abbott, U.S. Pat. No. 3,687,476, issued on Aug. 29, 1972, for Removable Dolly Wheel For Boat, there is disclosed a dolly for a boat with a wheel carrier for supporting the keel of the boat. A transverse telescopic beam extends from the wheel carrier. Chains with hooks grip the gunwales of the boat. The transverse length of the telescopic beam is adjustable.

The Lucker et al., U.S. Pat. No. 2,997,292, issued on Aug. 22, 1961, for Boat Jack, discloses a boat jack disposed at the forward end of the boat and a boat jack disposed at the aft end of the boat. The boat can be raised by the jacks and then rotated or rolled about its longitudinal axis to be supported on its side.

In the Tuggle, U.S. Pat. No. 4,327,933, issued on May 4, 1982, for Sailboat Carrier, there is disclosed a sailboat carrier in which transversely spaced wheels support transversely spaced V-shaped plates. The hulls of the sailboat seat o the V-shaped plates respectively. Straps and buckles extend respectively from the V-shaped plates to grip the upper portions of the hulls, respectively.

In the Palamara, U.S. Pat. No. 4,429,893, issued on Feb. 7, 1984, for Boat Trailer, there is disclosed a boat trailer with a transverse beam. Extending longitudinally from the transverse beam are parallel suspension springs. Carpeting is fixed to the distal end of each of the suspension springs. The boat is protected from damage by the carpeting.

SUMMARY OF THE INVENTION

An object of the present invention is to provide a boat dolly for small craft that enables a single person to move the boat carried by the dolly.

A feature of the present invention is the boat carried by the boat dolly of the present invention is balanced from end-to-end and from side-to-side for enabling the boat carried by the dolly to be moved with facility and with ease of operation.

Another feature of the present invention is that the boat dolly is relatively compact so as not to require substantial storage space.

Another object of the present invention is that the boat dolly is adjustable in dimensions to accommodate the various dimensions of different small craft.

Briefly described, a boat dolly comprising a wheel carrier with spaced abutment plates which support a boat tipped on its side by engaging the bottom wall of the boat and by engaging the lower side gunwale of the boat.

A BRIEF DESCRIPTION OF THE DRAWINGS

FIG. 1 is a rear elevation view of the boat dolly embodying the present invention illustrated with a diagrammatic fragmented section of a boat supported thereon.

FIG. 2 is a plan view of the boat dolly shown in FIG. 1.

FIG. 3 is a bottom view of the boat dolly shown in FIGS. 1 and 2.

FIG. 4 is a front perspective view of the boat dolly shown in FIGS. 1-3 illustrated supporting a boat as viewed from the bottom of the boat standing on one side thereof.

FIG. 5 is a rear perspective view of the boat dolly shown in FIGS. 1-4 illustrated supporting the boat as viewed from the top of the boat standing on said one side thereof.

DETAILED DESCRIPTION OF THE PREFERRED EMBODIMENT

Illustrated in FIGS. 1-3 is the boat dolly 10 embodying the present invention. The boat dolly 10 comprises spaced wheels 15 and 16. When supporting a boat B, the wheels 15 and 16 are spaced apart in a direction generally transverse to the fore and aft direction of the boat B. The wheels 15 and 16 carry stub axles 17 and 18, respectively, about which there is respective free rotation. A vertical plane passing through the axis of the axles 17 and 18 would be generally perpendicular to the keel of the boat B supported by the boat dolly 10.

Welded or otherwise fixed to the axles 17 and 18 is a support base 20. In the preferred embodiment, the support base 20 is made of steel. The support base 20 is disposed between the wheels 15 and 16 and comprises spaced apart support plates 21 and 22. The support plates 21 and 22 are spaced apart at 23 in the fore and aft direction of the boat supported by the boat dolly 10. As viewed from the boat dolly 10, the support plates 21 and 22 extend longitudinally between the wheels 15 and 16, and the support plates 21 and 22 are spaced apart at 23 transversely relative to the support base 20. Along the confronting longitudinal edges of the support plates 21 and 22 are depending flanges 24 and 25, respectively, which extend along the space 23 between the support plates 21 and 22 (FIG. 3).

At one end of the support base 20 is fixedly secured, such as by welding, a fixed abutment plate 30. The fixed abutment plate 30 comprises a flat base member 30a that is fixed to the base plate 20 and extends in a generally horizontal direction therealong. Projecting from the base member 30a is an upright member 30b (FIG. 1) of the fixed abutment plate 30. The upright member 30b is disposed adjacent the wheel 15 in confronting relation therewith. From the top of the upright member 30b projects an angularly disposed member 30c of the fixed abutment plate 30. The angularly disposed member 30c projects upwardly and away from the wheel 15 so as to overlie partially the base member 30a.

In the preferred embodiment, the fixed abutment plate 30 is formed from a single sheet of steel and the members 30a–30c are integrally formed. Secured to the exposed, confronting surfaces of the members 30a–30c is a protective cover 31, which serves to protect the boat from damage, marring or the like. The protective cover 31, such as carpeting, is caused to adhere to the fixed abutment plate 30 by a suitable adhesive. It is apparent that suitable non-marring material other than carpeting may be employed. The fixed abutment plate 30 is configured to receive securely therein the gunwale of the boat B.

At the opposite end section of the support base 20 is an adjustably positioned, releasably secured abutment plate 35. The adjustable abutment plate 35 comprises a base member 35a, which seats on the support plates 21 and 22 of the base plate 20 in overlying relation to the space 23. Suitable openings are formed in the base member 35a overlying the space 23. Suitable upright bolts 36 and 37 are disposed within the openings formed in the base member 35a so that the head of the bolts 36 and 37 rest on the base member 35a. The shafts 38 and 39 of the bolts 36 and 37, respectively, are disposed within the space 23 and are capable of moving within the space 23 longitudinally along the support base 20. Nuts 40 and 41 are disposed in threaded engagement with the shafts 38 and 39, respectively, of the bolts 36 and 37, and are disposed below the support base 20. The depending flanges 24 and 25 of the support plates 21 and 22 serve to guide the shafts of the bolts 36 and 37 in the longitudinal movement along the support base 20.

By rotating the nuts 40 and 41 to remove the same from locking engagement with the support base 20, the adjustable abutment plate 35 can be moved for adjustable positioning along the support base 20. By rotating the nuts 40 and 41 in the opposite direction for locking engagement with the support base 20, the adjustable abutment plate 35 can be secured to the support base 20 in the adjusted position.

The adjustable abutment plate 35 also includes an upstanding arcuate member 35b that extends upwardly from the end of the base member 35, which end is the more distant end from the wheel 16. The upstanding arcuate member 35b is generally bowed so that the generally convex surface thereof faces the fixed abutment member 30. Suitable protective covering 45 is caused to adhere to the generally convex surface of the upstanding arcuate member 35b confronting the fixed abutment member 30. A suitable adhesive is employed to fixedly secure the protective covering to the upstanding arcuate member 35b. In the preferred embodiment, the protective cover is carpeting. It is apparent that other suitable non-marring protective material may be employed in lieu of the carpeting 45. The arcuate member 35b engages the bottom wall of the boat B so as to provide a broad, easy to use surface of convenient height to retain securely the boat B on the support base 20.

Projecting downwardly and outwardly from the arcuate member 35b toward the wheel 16 is an angular member 35c of the adjustable abutment plate 35. Extending between the lower end of the angular member 35c and the end of the base member 35a confronting the wheel 16 is an upright member 35d of the adjustable abutment plate 35. The upright member 35d is welded, in the exemplary embodiment, to the angular member 35c and the base member 35a. In the exemplary embodiment, the members 35a–35c of the adjustable abutment plate 35 are integrally formed or constitutes a unitary steel plate. In the preferred embodiment, the adjustable abutment plate is made of steel.

In the use of the boat dolly 10, the boat B is positioned so that the keel thereof extends generally horizontally and the bottom wall and the gunwale of the boat B are disposed in a generally upright direction. The lower gunwale of the boat B is moved into engagement with the carpeting 31 of the fixed abutment plate 30 (FIG. 4) while the boat B is in the above-described position and supported by the support base 20. The adjustable abutment plate 35 is releasably secured to the support base 20 in an adjusted position for engaging the carpeting 45 thereof with the lower section of the bottom wall of the boat B while the boat B is in the above-described position and supported by the support base (FIG. 5). The boat B is now carried by the boat dolly 10 for movement to a desired location. The boat B is balanced fore and aft and also from top to bottom. When so balanced, the boat B can be maneuvered with facility and ease of operation.

What is claimed is:

1. A boat dolly for a boat having a keel, a bottom wall and a sidewall extending longitudinally along said bottom wall, said longitudinally extending sidewall forming a free longitudinally extending edge spaced from said bottom wall, said boat dolly comprising:
    (a) a support base on which the boat is supported with the keel of the boat disposed generally horizontal and extending in the longitudinal direction, and with the bottom wall of the boat being disposed in a generally upright direction, and with the longitudinally extending sidewall of the boat projecting generally laterally from the bottom wall of the boat, and with the longitudinally extending free edge of the sidewall of the boat being spaced generally laterally from the bottom wall of the boat, said support base extending in a direction generally transverse to the longitudinally extending sidewall;
    (b) wheel means supporting said support base for movement in a direction in which the keel is directed:
    (c) first abutment means secured to said support base for abutting against the longitudinally extending free edge of the sidewall of the boat, said first abutment means comprising a generally upright member for engaging the sidewall of the boat and an angularly extending member projecting from said generally upright member in the direction of the bottom wall of the boat; and
    (d) second abutment means secured to said support base in spaced relation to said first abutment means in a direction transverse to the sidewall of the boat, said second abutment means comprising a member projecting upwardly from said support base for abutting against the bottom wall of the boat, said first abutment means and said second abutment means being oppositely directed for abutment with the longitudinally extending free edge of the sidewall of the boat and with the bottom wall of the boat respectively, at least one of said abutment means being releasably secured to said support base for adjustable positioning therealong for regulating the distance between said first abutment means and said second abutment means.

2. A boat dolly as claimed in claim 1 wherein said first abutment means is fixedly secured to said support base, and said second abutment means is the abutment means releasably secured to said support base for adjustable positioning therealong.

3. A boat dolly as claimed in claim 2 wherein said support base comprises a plurality of longitudinally extending members spaced apart in a direction transverse to the keel to define a longitudinally extending space therebetween, and wherein said second abutment means comprises releasably securing means disposed in said longitudinally extending space for adjustably positioning said second abutment means along said longitudinally extending members of said support base.

4. A boat dolly as claimed in claim 2 wherein said upwardly projecting member of said second abutment means comprises an upwardly extending arcuate member projecting upwardly above said support base, said upwardly extending arcuate member forming an arcuate surface curving away from said first abutment means, said upwardly extending arcuate surface of said second abutment means being configured to engage the bottom wall of the boat to retain the boat on said support base.

5. A boat dolly as claimed in claim 2 wherein said first abutment means comprises a base member on which the sidewall of the boat seats, a generally upright member extending upwardly from said base member for engaging the sidewall of the boat, said angularly extending member projecting from said generally upright member of said first abutment means toward said second abutment means and overlying the longitudinally extending free edge of the sidewall.

6. A boat dolly as claimed in claim 4 wherein said first abutment means comprises a base member on which the sidewall of the boat seats, a generally upright member extending upwardly from said base member for engaging the sidewall of the boat, said angularly extending member projecting from said generally upright member of said first abutment means toward said upwardly extending arcuate member of said second abutment means and overlying the longitudinally extending free edge of the sidewall.

7. A boat dolly as claimed in claim 2 wherein said second abutment means comprises an upwardly extending member forming a surface configured to engage the bottom wall of the boat to retain the boat on said support base.

8. A boat dolly as claimed in claim 2 wherein said first abutment means comprises a generally upright member for engaging the sidewall of the boat, said angularly extending member projecting from said generally upright member of said first abutment means toward said second abutment means and overlying the longitudinally extending free edge of the sidewall.

9. A boat dolly as claimed in claim 7 wherein said first abutment means comprises a generally upright member for engaging the sidewall of the boat, said angularly extending member projecting from said generally upright member of said first abutment means toward said second abutment means and overlying the longitudinally extending free edge of the sidewall.

10. A boat dolly as claimed in claim 9 and comprising protective covering means on said first abutment means engaging the sidewall of the boat to inhibit damage to the boat, and protective covering means on said second abutment means engaging the bottom wall of the boat to inhibit damage to the boat.

11. A boat dolly as claimed in claim 8 and comprising protective covering means on said first abutment means engaging the sidewall of the boat to inhibit damage to the boat, and protective covering means on said second abutment means engaging the bottom wall of the boat to inhibit damage to the boat.

12. A boat dolly for a boat having a keel, a bottom wall and a sidewall extending longitudinally along said bottom wall, said longitudinally extending sidewall forming a free longitudinally extending edge spaced from said bottom wall, said boat dolly comprising:

(a) a support base on which the boat is supported with the keel of the boat disposed generally horizontal and extending in the longitudinal direction, and with the bottom wall of the boat being disposed in a generally upright direction and extending in the longitudinal direction, and with the longitudinally extending sidewall of the boat projecting generally laterally from the bottom wall of the boat, and with the longitudinally extending free edge of the sidewall of the boat being spaced generally laterally from the bottom wall of the boat, said support base extending in a direction generally transverse to the longitudinally extending sidewall;

(b) wheel means supporting said support base for movement in a direction in which the keel is directed;

(c) first abutment means mounted on said support base for abutting against the longitudinally extending free edge of the sidewall of the boat to retain the boat on said support base, said first abutment means comprising a generally upright member for engaging the sidewall of the boat, and an angularly extending member projecting from said generally upright member of said first abutment means in the direction of the bottom wall of the boat and overlying the longitudinally extending free edge of the sidewall; and (d) second abutment means mounted on said support base and spaced from said first abutment means in a direction transverse to the longitudinally extending sidewall for abutting against the bottom wall of the boat, said first abutment means and said second abutment means being oppositely directed for abutment with the longitudinally extending free edge of the sidewall of the boat and with the bottom wall of the boat respectively, said second abutment means comprising an upwardly extending member projecting upwardly above said support base forming a surface configured to engage the bottom wall of the boat to retain the boat on said support base.

13. A boat dolly as claimed in claim 12 wherein said upwardly extending member of said second abutment means has an arcuate configuration forming an arcuate surface curving away from said first abutment means for engaging the bottom wall of the boat.

14. A boat dolly as claimed in claim 13 wherein said first abutment means comprises a base member from which said generally upright member of said first abutment means extends, the sidewall of the boat seats on said base member of said first abutment means.

15. A boat dolly as claimed in claim 12 and comprising protective covering means on said first abutment means engaging the sidewall of the boat to inhibit damage to the boat, and protective covering means on said second abutment means engaging the bottom wall of the boat to inhibit damage to the boat.

16. A boat dolly as claimed in claim 14 and comprising protective covering means on said first abutment means engaging the sidewall of the boat to inhibit damage to the boat, and protective covering means on said second abutment means engaging the bottom wall of the boat to inhibit damage to the boat.

17. A boat dolly for a boat having a keel, a bottom wall and a sidewall extending longitudinally along said bottom wall, said longitudinally extending sidewall forming a free longitudinally extending edge spaced from said bottom wall, said boat dolly comprising:

(a) a support base on which the boat is supported with the keel of the boat disposed generally horizontal and extending in the longitudinal direction, and with the bottom wall of the boat being disposed in a generally upright direction and extending in the longitudinal direction, and with the longitudinally extending sidewall of the boat projecting generally laterally from the bottom wall of the boat, and with the longitudinally extending free edge of the sidewall of the boat being spaced generally laterally from the bottom wall of the boat, said support base extending in a direction generally transverse to the longitudinally extending sidewall;

(b) wheel means supporting said support base for movement in a direction in which the keel is directed;

(c) first abutment means mounted on said support base for abutting against the longitudinally extending free edge of the sidewall of the boat to retain the boat on said support base, said first abutment means comprising a generally upright member for engaging the sidewall of the boat; and an angularly extending member projecting from said generally upright member in the direction of the bottom wall of the boat and (d) second abutment means mounted on said support base and spaced from said first abutment means in a direction transverse to the longitudinally extending sidewall for abutting against the bottom wall of the boat, said first abutment means and said second abutment means being oppositely directed for abutment with the longitudinally extending free edge of the sidewall of the boat and with the bottom wall of the boat respectively, said second abutment means comprising an upwardly extending member projecting upwardly above said support base forming a surface configured to engage the bottom wall of the boat to retain the boat on said support base.

* * * * *